United States Patent [19]
LaRoche et al.

[11] Patent Number: 4,882,173
[45] Date of Patent: Nov. 21, 1989

[54] APPARATUS FOR MOLDING THERMOPLASTIC MATERIAL

[75] Inventors: Wayne D. LaRoche, Farmington; John D. Gray, New Durham, both of N.H.

[73] Assignee: Davidson Textron Inc., Dover, N.H.

[21] Appl. No.: 77,435

[22] Filed: Jul. 24, 1987

[51] Int. Cl.$^4$ .............. B29C 31/10; B29C 39/12; B29C 41/18; B29C 41/22

[52] U.S. Cl. .................. 425/130; 249/104; 249/140; 264/245; 264/255; 264/302; 425/256; 425/435

[58] Field of Search ............. 264/245, 246, 247, 255, 264/309, 163, 302, 303, 304; 249/104, 103, 140; 425/112, 133, 435, 130, 256, 257

[56] References Cited

U.S. PATENT DOCUMENTS

| | | | |
|---|---|---|---|
| 2,007,961 | 7/1935 | Bolton | 264/247 X |
| 2,861,911 | 11/1958 | Martin et al. | 264/309 X |
| 4,011,292 | 3/1977 | Randall | 264/245 X |
| 4,252,762 | 2/1981 | Stevenson | 264/255 X |
| 4,472,451 | 9/1984 | Mulder | 425/112 X |
| 4,519,972 | 5/1985 | Stevenson | 249/104 X |
| 4,562,025 | 12/1985 | Gray | 264/DIG. 60 X |
| 4,606,868 | 8/1986 | Christoph et al. | 264/302 X |
| 4,610,620 | 9/1986 | Gray | 425/435 X |
| 4,634,360 | 1/1987 | Gray | 425/435 X |
| 4,683,098 | 7/1987 | Belleville et al. | 425/435 X |
| 4,716,003 | 12/1987 | Gandreau | 264/302 |

FOREIGN PATENT DOCUMENTS

| | | | |
|---|---|---|---|
| 0142113 | 8/1984 | Japan | 264/245 |
| 0808311 | 3/1981 | U.S.S.R. | 249/140 |

Primary Examiner—Jan H. Silbaugh
Assistant Examiner—Karen D. Kutach
Attorney, Agent, or Firm—John C. Evans

[57] ABSTRACT

Apparatus for manufacturing plastic shells having decorative features thereon includes a combination mask and container unit that is joined to a known heated mold to deposit a first semi-cured deposit on the mold from supplies of material in the combination mask and container; the mask is configured to have a plurality of wire reinforced foot portions with seal edges configured to be aligned with the sharp edges of recesses in the mold surface defining the decorative feature; when the combination unit is inverted it casts material only on the recesses to form a semi-fused deposit.

4 Claims, 4 Drawing Sheets

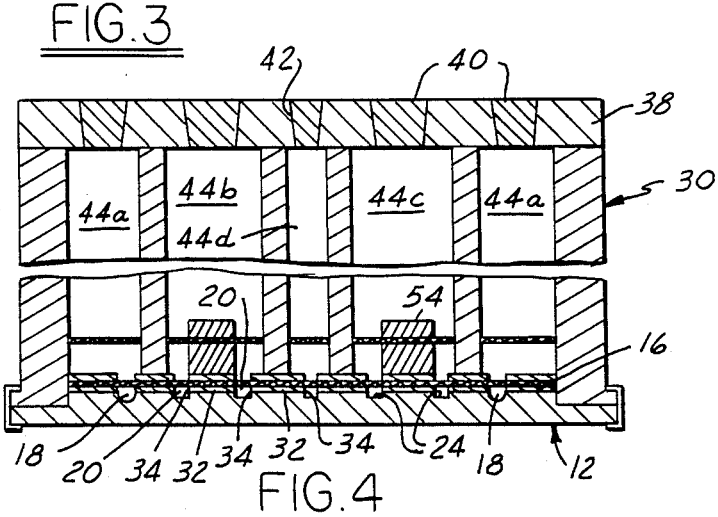
FIG. 3
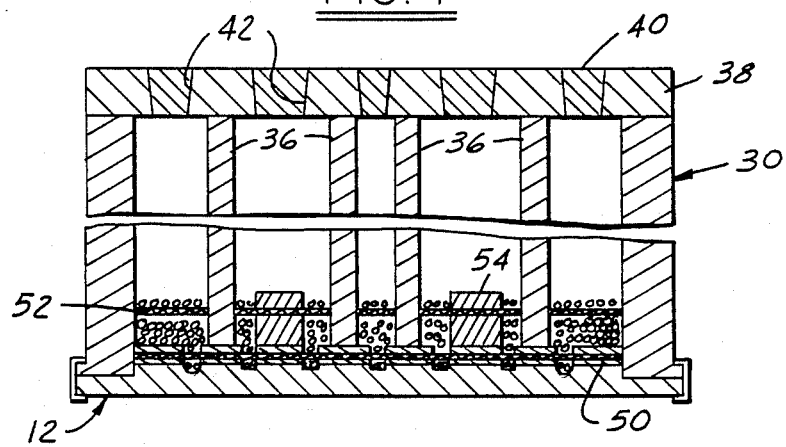
FIG. 4
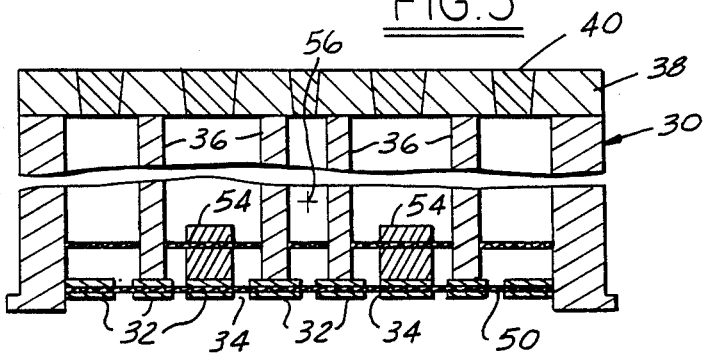
FIG. 5

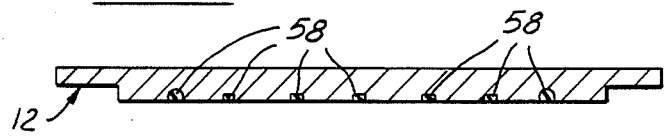
FIG.6
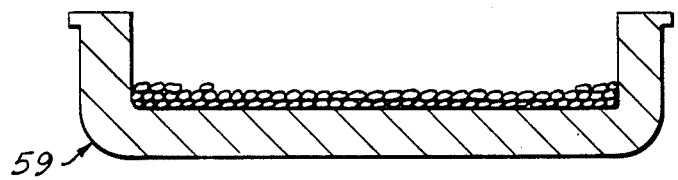
FIG.7
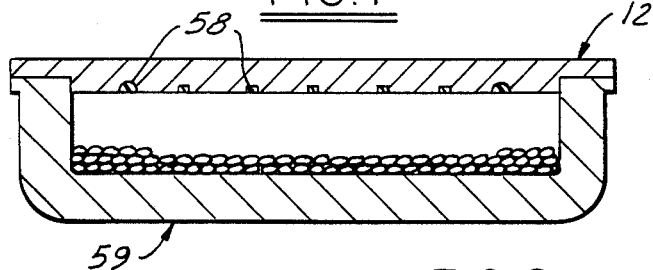
FIG.8
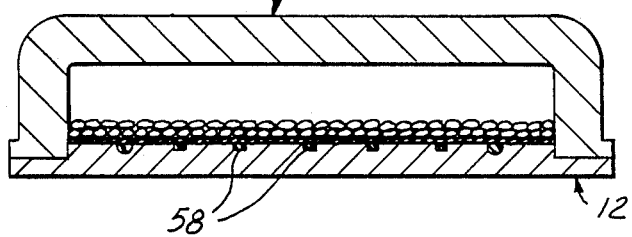
FIG.9
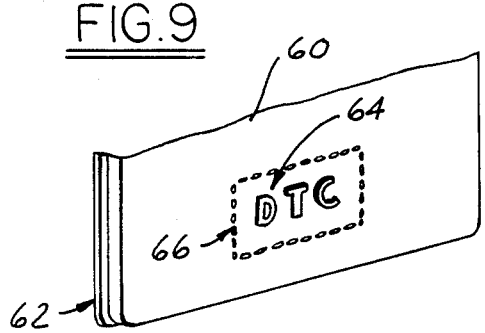

APPARATUS FOR MOLDING THERMOPLASTIC MATERIAL

TECHNICAL FIELD

This invention relates to cast thermoplastic shells and more particularly to improved apparatus and an improved method for producing cast thermoplastic articles with decorative features of contrasting color formed in situ of a base layer.

BACKGROUND ART

Various proposals have been suggested for forming a thin plastic shell product by apparatus and methods which utilize a heated mold and a casting system for distributing thermoplastic material on the mold. When the mold is heated the cast material is melted and fused to form a shell conforming to the shape of the mold.

USPN 4,610,620 discloses apparatus for molding plural colored plastic hollow shells by a process in which a decorative pinstripe is formed as an integrally bonded joint between first and second segments of the shell. The joint between the shell components is used to replace a mechanical connection between the segments and to define a color contrasting decorative feature in the finished part. The decorative feature is limited to a joint line application and is not formed in situ of a background base layer bonded thereto.

USPN 4,562,025 discloses a mold method and apparatus for multicolored plastic shells which include first and second colored segments on the cast shell product directly bonded to one another. Again, there are no decorative features formed in situ on the cast shell components of the product.

USPN 4,562,032 discloses a method for forming grain coverings on reaction injection molded articles. Such coverings are found on instrument panels and can include embedded stitch features around the periphery of the article to simulate stitched material.

Other proposals have been suggested for providing decorative features on plastic articles, including attachment of the decorative feature by separate connectors or by the use of adhesives.

STATEMENT OF INVENTIONS AND ADVANTAGES

A feature of the present invention is to provide an improved apparatus for casting contrasting color deposits on a mold surface having a compartment for the thermoplastic material wherein the improvement comprises a casting mold having recesses formed therein with marginal edges defining the outline of a decorative feature; combined mask and container means including heat resistant foot portions with sealing edges of a form to correspond to the marginal edges of the recesses and engageable with said mold to cover the mold in surrounding relationship to the recesses; and means in the combined mask and container means to supply dry thermoplastic material to the recesses when the sealing edges are in alignment with the marginal edges thereof while masking other portions of the mold; means for heating the mold to a temperature less than the fusion temperature of the thermoplastic material to produce a semi-cured deposit of material in the recesses; and means for distributing and heat bonding a color contrasting base layer of thermoplastic material on the semi-cured deposit to cure and bond both it and the base material prior to cooling and stripping the mold.

Another feature of the present invention is to provide a combined mask and container means including spaces between the foot portions with dry thermoplastic material which is distributed into mold recesses when the combined mask and container means is inverted with respect to said mold; means for heating the mold to a temperature below the fusion temperature of the deposited thermoplastic material to cause material deposited therein to form a semi-cured deposit on the mold; means for applying a base layer of thermoplastic material across the semi-cured deposit and the remainder of the mold; and the means for heating being operable to raise the mold to a temperature at which the semi-cured deposit and base layer will be fused and bonded prior to cooling and stripping the mold.

Still another feature is to provide bridge means joined to each of the foot portions for reinforcing the combination mask and container means, the bridge means overlying each recess and providing a path for depositing the thermoplastic material.

Other advantages and a more complete understanding of the invention will be more apparent from the succeeding detailed description of the invention and the accompanying drawings thereof.

BRIEF DESCRIPTION OF THE DRAWINGS

FIG. 3 is a sectional view showing the component parts joined;

FIG. 4 is a sectional view showing the components distributing dry thermoplastic material;

FIG. 5 is a sectional view showing a combined mask and compartment unit separated from a casting mold;

FIGS. 6-8 show mold tooling for casting a base layer of thermoplastic material on decorative feature segments;

FIG. 9 is a view of a product made by the process of the present invention;

DETAILED DESCRIPTION OF THE INVENTION

The present invention will be discussed with reference to the manufacture of either decorative colored lettering formed in situ of a base layer of thermoplastic material or the manufacture of colored stitching in such base layer. The manufacture resulting from use of the apparatus and process of the present invention can be of many kinds including luggage made from plastic, interior trim parts for automobiles, furniture, toys or any other article which desirably includes decorative features or indicia therein.

Figure 1:
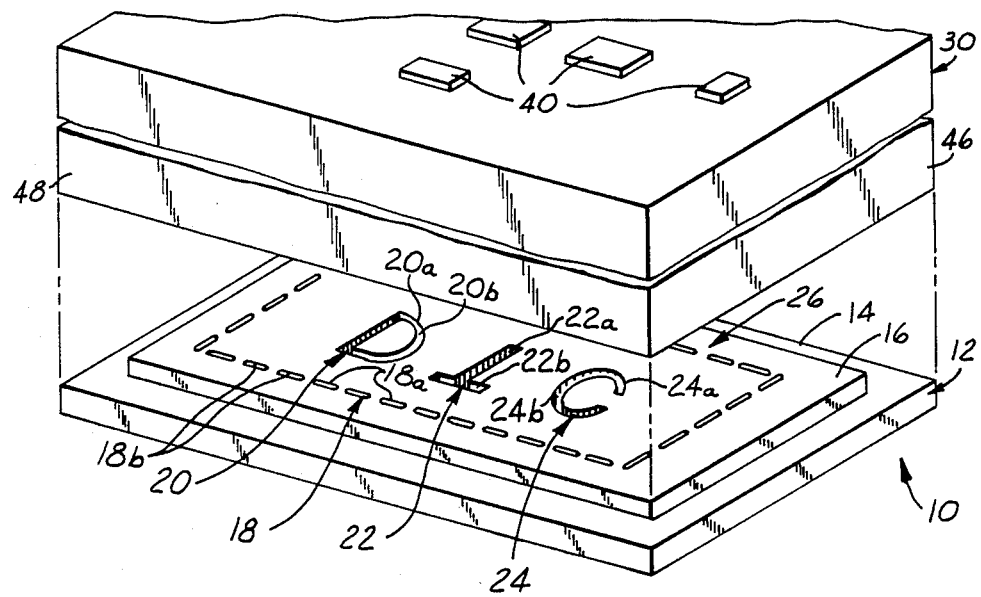
FIG. 1 is a perspective view of mold tooling including the present invention.
Figure 2:
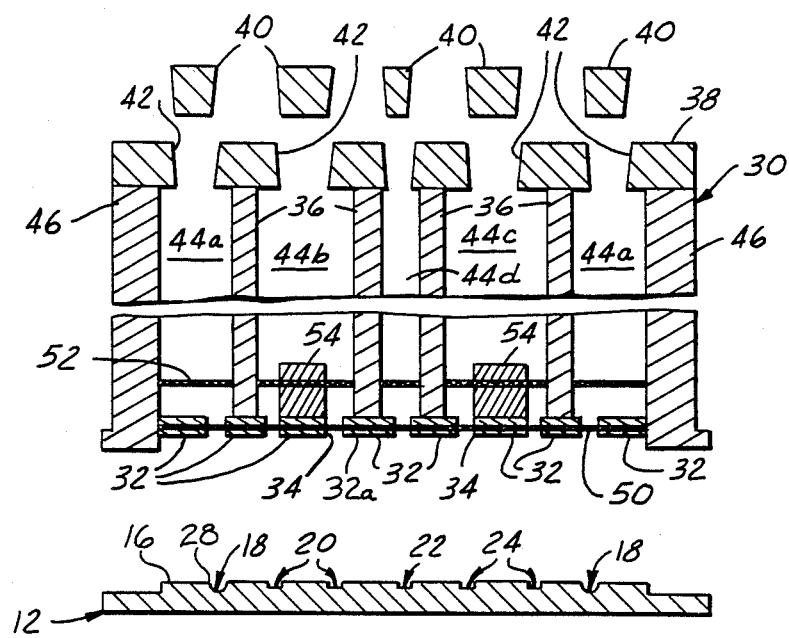
FIG. 2 is a sectional view showing the component parts of the tooling of FIG. 1 separated.

Referring to FIG. 1 mold tooling 10 is illustrated including a casting mold 12 which is adapted to be selectively heated to raise a casting surface 14 thereon to controlled temperatures below, at and above the melt/fusion temperature of thermoplastic material being cast thereon.

The casting surface 14 includes a normal surface 16 with a plurality of recesses 18, 20, 22, 24 therein. Each of the recesses 18, 20, 22, 24 have a closed marginal edge 18 a, 20a, 22a, 24a each forming separate recess cavities 18b, 20b, 22b, 24 b. The recesses 18 are configured as a perimeter stitch around letters 20, 22, 24 which define a logo 26.

Each of the recesses have a peripheral edge 28 that is a sharp break line at the normal surface 16.

In accordance with the present invention each of the recesses 18, 20, 22, 24 are supplied with a different colored thermoplastic material which is deposited in the recesses to form a decorative feature in situ of a base layer of material.

The invention includes a combination masking and compartment unit 30 (hereinafter referred to as the combination unit 30) which is configured to supply the aforementioned colored material and to further seal the casting surface 14 so that material is only deposited in the recesses when the combination unit 30 is joined to the casting mold 12.

The combination unit 30 includes a plurality of spaced foot portions 32 each having an end surface 32a. Each foot portion has a seal edge 34 configured to conform to the shape of the peripheral edges 28 of the recesses. The foot portions 32 are formed of cast RTV which will seal against the normal surface 16 but will be heat resistant so that thermoplastic material will not be deposited as a build up thereon during the casting process.

The foot portions 32, in the illustrated embodiment are joined to vertical walls 36 which connect at their upper end to a cover 38. The cover 38 has a plurality of feed plugs 40 therein for closing openings 42 into compartments 44 formed between each of the vertical walls 36. The vertical walls 36 cooperate with side walls 46, 48 to separate the compartments 44 from each other so that a different color of thermoplastic material can be stored in each of the compartments 44 without mixing. The thermoplastic material is a resin with a plasticizer and dye components and is formed as a dry powder material having a particle size in the range of 50-350 microns.

The combination unit 30 is reinforced by two sheets of wire mesh material 50, 52. The wire mesh sheet 50 is cast into the foot portions 32 and bridges the gaps therebetween which define the width and length of the recesses 18-24. The mesh is sized to permit free gravity flow through the sheet 50 during a casting step to be discussed.

The sheet 52 bridges the vertical walls 36 to reinforce the compartments 44. In the illustrated arrangement the shape of the lettering is such that two of the foot portions 32 have a pier segment 54 thereon that is joined to the sheet 52 but which serves to locate the foot portion to seal the peripheral edges of the recesses defining the illustrated letters D and C into which different colored material is flowed from compartments 44b, 44c. Compartment 44a is a compartment which surrounds the lettering compartments and includes a color of material which will highlight a stitch feature deposited into the stitch recesses 18.

When the combination unit 30 is joined to the casting mold 12 as shown in FIG. 3 the plugs 40 are removed and the mold is heated to a desired pre-fusion temperature at which the thermoplastic material will partially fuse on the casting mold 12.

Material of different colors is fed into the compartments 44a-44d and the plugs 40 are inserted into the cover. The joined casting mold 12 and combination unit 30 are rotated about preselected axes, for example, a horizontal axis 56 to distribute the material in each of the compartments 44a-44d to a selected one of the mold recesses 18-24.

When the combination unit 30 is joined to the casting mold the seal edges 34 and end surfaces 32a on the foot portions 32 will completely seal the normal mold surface 16 so that the thermoplastic material in the compartments 44a-44d will only be cast into the recesses defining the decorative feature. The mold tool 12 is preferably heated to a temperature below the cure temperature of the deposited material so that the recesses will be filled with material that adheres thereto but is only semi-cured.

The combination unit 30 is disconnected from the mold tool 12 once the semi-cured deposits are formed therein as shown in FIG. 5 with any excess material being returned to the compartments 44a-44d.

The mold tool 12 with semi-cured segments 58 therein is then heated to a temperature which will fuse the thermoplastic material therein and to be cast thereagainst. The mold tool 12 is connected to a source 59 of contrasting color thermoplastic material and the joined units shown in FIG. 7 are inverted as shown in FIG. 8 to cast a base layer 60 of thermoplastic material against the mold surface 14 to cover the segments 58 and the exposed portions of the normal surface 16. The base layer 60 is fused and bonded to the segments 58. The mold is then cooled and stripped to form the article 62 shown in FIG. 9 having raised lettering 64 of three different colors surrounded by a raised stitch 66 of a color which differs from that of the base layer 60. Each of the letters and the stitch are formed in situ of the base layer 60 at the bond joint therebetween.

Figure 10:
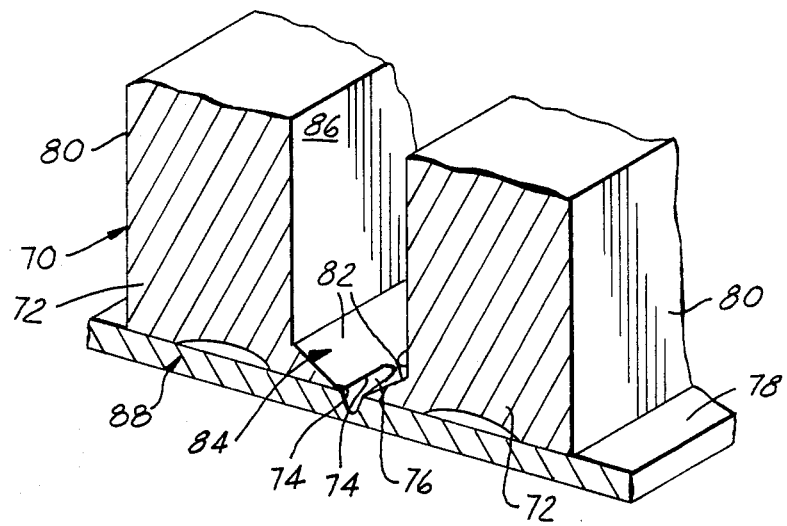
FIG. 10 is a fragmentary perspective view of a combined masking and compartment unit for use in the manufacture of colored stitch features.

The embodiment of the invention shown in FIG. 10 is a fragment of a combination masking and compartment unit 70 which corresponds to the combination unit 30. In the unit 70 all the foot portions 72 are configured to have a peripheral sealing edge 74. It is conformed to stitch recesses 76 in a mold tool surface 78. The foot portions 72 each have flat vertical surfaces 80 on one side and inwardly sloping surfaces 82 on the other side. Surfaces 82 form a chute 84 leading from a dry powder compartment 86 to the recesses 76. The chute 84 serves to focus the thermoplastic flow into the recesses to assure complete filling of the stitch defining surfaces thereof. The foot portions 72 are made from a suitable heat resistant material with low heat conductivity. Thermoplastic material will not adhere to such material. The combination unit 70 is connected to a mold tool 88 at the surface 78 thereon. It is operated in the same manner as combination unit 30. A semi-cured deposit in the recesses 76 of a color contrasting to that of a base layer which is formed on the mold tool surface 78. It is formed in the same manner as discussed with respect to the previous embodiment.

Figure 11:
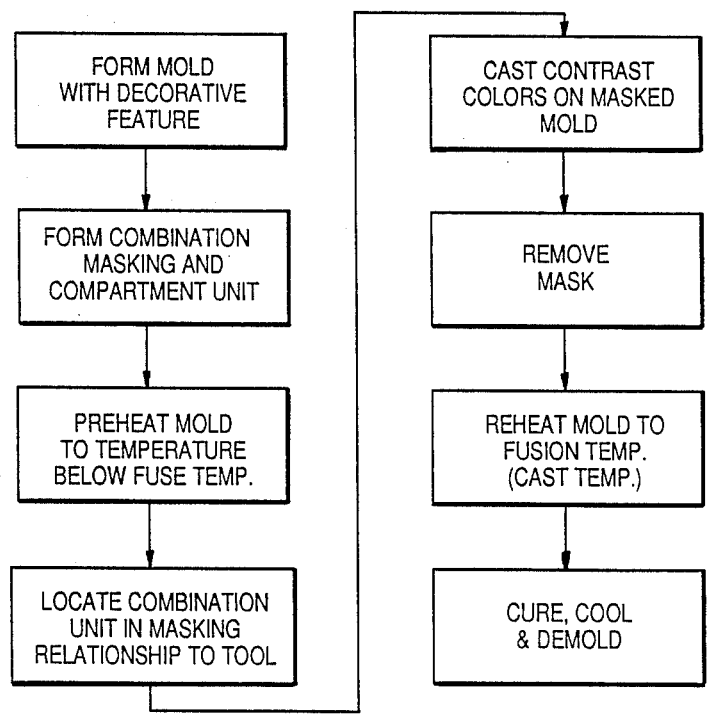
FIG. 11 is a flow chart showing the process of the present invention.

The process is set forth in FIG. 11 as including the steps of preforming a mold tool with a desired recess decorative pattern cut in a normal mold surface. The combination masking and compartment unit is designed to conform to the pattern of the recesses by arranging the feed compartments in alignment only with the recesses and masking all other portions of the mold surface from the material in the container spaces.

The mold is then preheated to a temperature below the fusion temperature of the thermoplastic material and the material in the container spaces is cast as a contrasting color into the recesses where it is semi-cured.

The combination unit is removed from the mold tooling to unmask the normal casting surface of the mold tooling. The mold tool is then reheated to a casting temperature at which the thermoplastic material will be fused and another source (contrasting color) of thermoplastic material is deposited on the normal surface and the decorative segments. The material is cured to bond the different colored materials. The previously deposited material in the recesses is fused to the base layer which has a color that is different from the color or colors of the decorative feature.

The mold is then cooled and stripped or demolded to form a plastic part with a colored background with raised decorative features on the eye discernible surface of the background which features are formed in situ of the base layer material.

Various different color effects can be achieved with a given logo design by forming individual color compartments behind the color mask.

While representative embodiments of apparatus and processes of the present invention have been shown and discussed, those skilled in the art will recognize that various changes and modifications may be made within the terms of the present invention as set forth in the following claims.

What is claimed is:

1. In apparatus for molding decorative features in a base layer of thermoplastic material which is formed by casting dry thermoplastic particles having a fusion temperature against a heated mold surface, the improvement comprising;

a casting mold having a mold surface with recesses formed therein having closed marginal edges defining a decorative feature;

a combined mask and container means connectable with respect to said casting mold; said combined mask and container means including heat resistant foot portions with sealing edges of a form to correspond to said closed marginal edges of said recesses and with end surfaces engageable with said mold to cover said mold surface in surrounding relationship to said recesses to as to prevent fusion of thermoplastic material thereon other than in said recesses;

first distribution means including said combined mask and container means operable to supply a plurality of different colored dry thermoplastic materials and to distribute different colored particles to preselected ones of said recesses when said sealing edges are in alignment with said marginal edges thereof while said end surfaces are masking thermoplastic material from other portions of said mold in surrounding relationship to said recesses;

means for heating said mold surface to a temperature less than said fusion temperature of said thermoplastic material to produce a semi-cured deposit of material in said recesses;

said first distribution means operable to return excess thermoplastic from said heated mold surface when said combined mask and container means is disconnected from said heated mold surface; and second distribution means for distributing color contrasting base layer of thermoplastic material onto said semi-cured deposit of material for subsequent curing and bonding of said semi-cured deposit and base layer of thermoplastic material prior to cooling said and stripping said mold.

2. In the combination of claim 1, said combined mask and container means including separate compartments between each of said foot portions for containing dry thermoplastic material of different color to be distributed into said recesses when said combined mask and container means is in an inverted relationship with respect to said mold;

said means for heating being operable to raise said temperature of said heated mold surface to a temperature at which said semi-cured deposit and said base layer of thermoplastic material will be fused to bond said semi-cured deposit to said base layer prior to cooling and stripping said mold.

3. In the combination of claim 2, bridge means joined to each of said foot portions for reinforcing said combination mask and container means, said bridge means overlying each of said recesses and providing a path for distributing said different colored thermoplastic materials into said recesses;

said foot portions having inclined surfaces thereon forming a chute for distributing thermoplastic material into said recesses.

4. In the combination of claim 3, said bridge means including a sheet of screening embedded in said foot portions.

* * * * *